United States Patent [19]

Sink

[11] Patent Number: 4,776,503

[45] Date of Patent: Oct. 11, 1988

[54] HUNTING, BACKPACKING AND CAMPING ACCESSORY

[76] Inventor: Robert L. Sink, 4781 "B" Rd., New Paris, Ohio 45347

[21] Appl. No.: 23,516

[22] Filed: Mar. 9, 1987

[51] Int. Cl.⁴ ............................ A45F 4/02; E04G 1/00
[52] U.S. Cl. .................................... 224/153; 224/210; 182/187
[58] Field of Search ............... 224/151, 153, 154, 155, 224/210, 211, 261, 262; 182/187; 108/152

[56] References Cited

U.S. PATENT DOCUMENTS

| | | | |
|---|---|---|---|
| 3,241,734 | 3/1966 | Gray | 224/155 |
| 3,368,725 | 2/1968 | Martin | 224/155 |
| 3,944,022 | 3/1976 | Ming | 224/153 X |
| 4,022,292 | 5/1977 | Van Gompel | 224/155 X |
| 4,124,094 | 11/1978 | Cande | 182/187 |
| 4,148,376 | 4/1979 | Campbell, Jr. | 182/187 X |
| 4,493,395 | 1/1985 | Rittenhouse | 182/187 |
| 4,582,165 | 4/1986 | Latini | 224/155 X |
| 4,600,081 | 7/1986 | Wade | 182/187 |

OTHER PUBLICATIONS pp. 97–99 of Bow and Arrow Bowhunter's Annual, No. 11, 1986.

*Primary Examiner*—Henry J. Recla
*Assistant Examiner*—Robert Petrik
*Attorney, Agent, or Firm*—Biebel, French & Nauman

[57] ABSTRACT

A combination hunting, backpacking and camping accessory that can be used as a hunter's climbing seat, a blind support, a backpack or a portable shelf for camp sites is formed from a pair of interconnected frame components each having first and second sections, a cross brace attached to the first sections and a support member releasably secured to the second sections. A cable or other flexible member is fixed at one end to the cross brace, has a series of stops attached to it along its length and is received in an open notch in the cross brace. When used as a climbing seat the cable is wrapped around a tree with the first sections extending downwardly, but when used as a backpack the accessory is reversed and the cable wrapped around the wearer's waist. When used as a shelf or a blind support the support member may be removed and replaced with extensions slipped over the second sections.

10 Claims, 3 Drawing Sheets

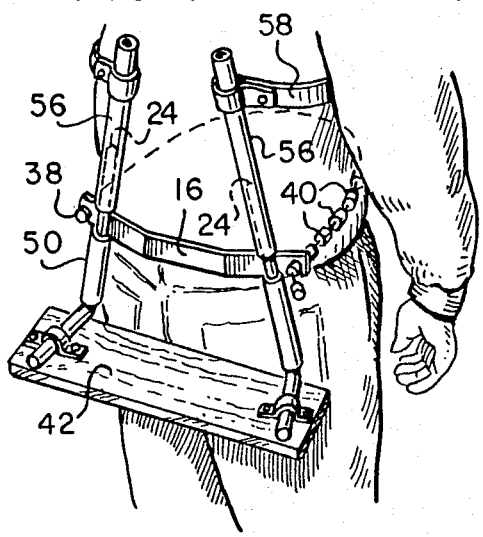
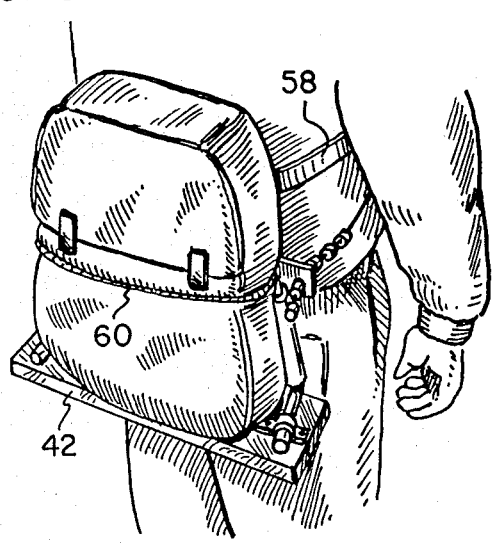
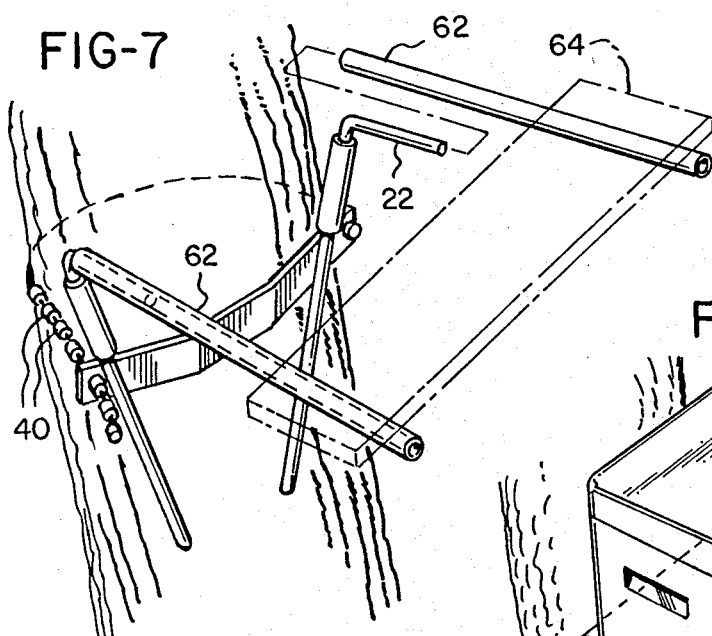
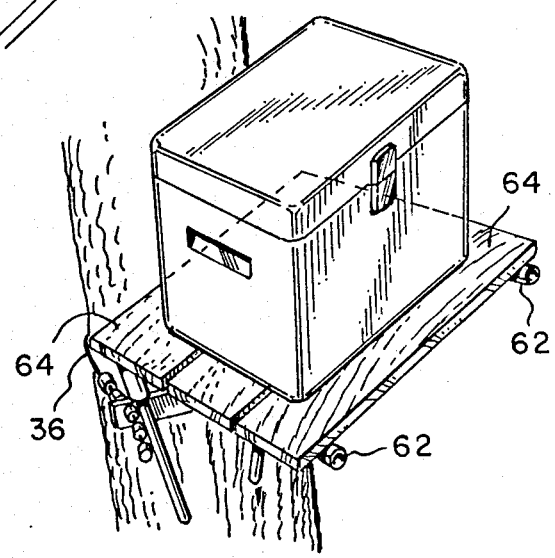

HUNTING, BACKPACKING AND CAMPING ACCESSORY

BACKGROUND OF THE INVENTION

It is often desirable to hunt from a tree stand, and a number of devices have been designed for this purpose. For example, see Bow & Arrow magazine's Bowhunter's Annual, No. 11, 1986, pp. 97-99, wherein a variety of tree stands are illustrated. Some, such as that identified on p. 98 as the JVA-ASTRO, can be used as a so-called "climbing seat", in that they are intended to be used in conjunction with a tree stand to climb to a desired height along a tree trunk.

A similar device is described in U.S. Pat. No. 4,600,081, where a seat is shown that can be used in connection with other tree platforms. Although not disclosed specifically as a hunter's climbing seat, the device shown in U.S. Pat. No. 2,991,842 is attached to a tree by a chain to provide a seat. Also, U.S. Pat. No. 683,527 describes a scaffold primarily for linemen which includes a seat adapted to be attached to a utility pole by a chain.

SUMMARY OF THE INVENTION

In accordance with the present invention a lightweight, hunter's climbing seat is provided which is of simple but efficient design, and which can be used, not only as a climbing seat, but also as a backpack, a camp shelf and a frame for a hunter's blind.

Thus, the combination climbing seat, backpack, camp shelf and blind support of the present invention includes a pair of primary frame components having first and second sections and a cross brace interconnecting the components to provide a basic framework, a cable or other flexible member for securing the framework to members of varying girths, and a support member attached to the framework.

The primary frame components may conveniently be constructed from round metal bar stock bent intermediate its ends to form the first and second sections. The cross brace may be formed from a strip of flat metal stock and welded to the first sections of the components, with outer ends of the cross brace having the cable fixed to one of them and adjustably attached to the other. The support member spans the second sections and is releasably secured to them to form a seat or a pack board.

When used as a climbing seat the first sections are positioned to extend along a tree trunk with their sharpened lower distal ends digging into the trunk and with the second sections projecting outwardly, approximately horizontally, above the first sections to receive the support member as a seat.

When used as a backpack the device is inverted from the orientation used in the climbing seat configuration and the first sections then extend upwardly along the wearer's body, the second sections and support member project outwardly beneath the first sections to receive the load, and the cable or other flexible member encircles the wearer's waist. In this mode pipes or other tubular members can be slipped over the first sections and their sharpened ends, and a tarp strap or the like secured to the pipes and passed around the wearer's chest for enhanced stability.

In the camp shelf mode the device is attached to a tree in the same manner as in the climbing seat configuration, but the clips securing the supporting member to the second sections may be unfastened, allowing removal of the support member. Thereafter, extensions, such as lengths of pipe, may be slipped over the second sections to serve as a support for boards, branches or other material placed on them to provide a shelf of sufficient area to accommodate a camp stove, cooler or other camping equipment.

Similarly, a frame for a hunter's blind can be provided by removing the support member, placing extensions of suitable length over the second sections, positioning the device on a tree at the desired height, and then draping camouflage netting or other material over the extensions. In this regard a second device with the support member attached can be used as a seat within the blind.

The first sections diverge outwardly away from each other from their distal ends to their opposite ends, and the second sections diverge outwardly away from each other from their inner ends to their outer ends. With this construction a wide variety of tree trunk diameters can be accommodated and the distal ends of the first sections are urged into the tree trunk by the supported weight, and the support member will not slip off the second sections even though the securing clips are somewhat loosened.

When climbing a tree using the device of the present invention the climber grasps the first sections intermediate the cross brace and the support member to support his weight and that of the tree stand attached to his feet as he, for example, draws the stand upwardly, and in the preferred embodiment of the invention hand grips of rubber, plastic or any other suitable material, are received on the first sections to facilitate this manuever.

While any suitable flexible member may be used for attaching the device to a tree or wearer, a high strength steel cable has been found to function satisfactorily, with one end of the cable attached to, for example, one outer end of the cross brace. An angularly disposed, open notch formed in the other outer end of the cross brace receives the other end of the cable and a plurality of aluminum slip rings are crimped to the cable to form a set of spaced stops.

Thus, it will be seen from the above and the following detailed description that the present invention provides a climbing seat that can also function as a backpack, and with simple modifications, a camp shelf and a frame for a hunter's blind, in a lightweight, simple and efficient construction.

BRIEF DESCRIPTION OF THE DRAWINGS

FIGS. 5 and 6 illustrate the invention in a backpack mode;
FIGS. 7 and 8 show the conversion to a camp shelf.

DESCRIPTION OF THE PREFERRED EMBODIMENTS

Figure 1:
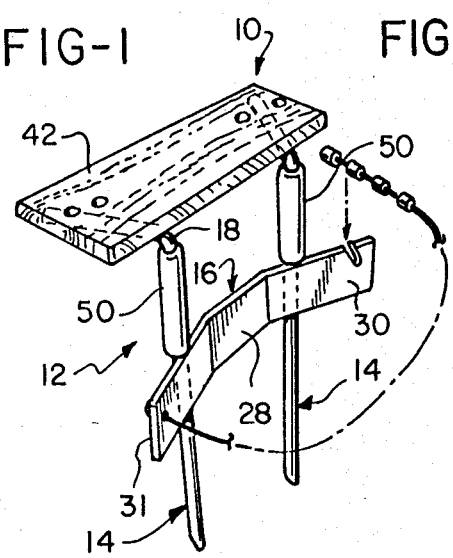
FIG. 1 is a perspective view of the present invention.
Figure 2:
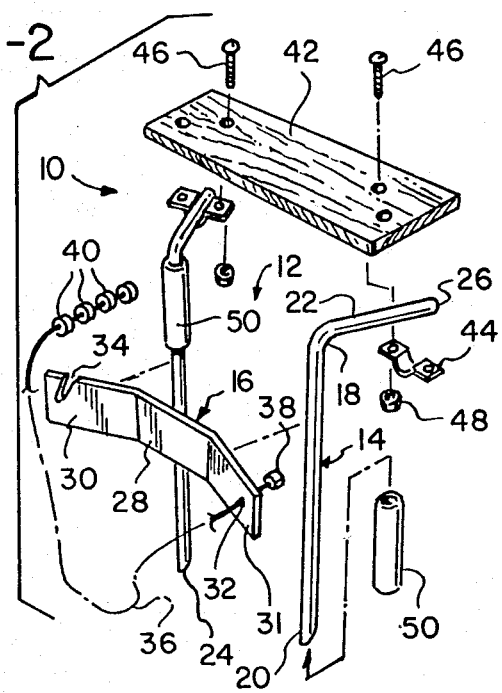
FIG. 2 is an exploded perspective view thereof.
Figure 10:
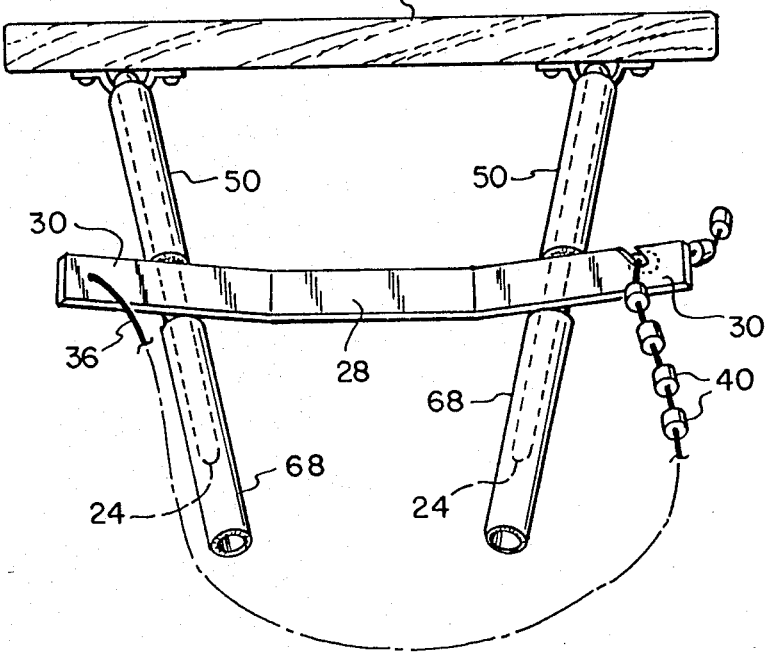
FIG. 10 is an elevational view of the invention.

With reference initially to FIGS. 1, 2 and 10, it will be seen that the combination hunting, backpacking and camping accessory 10 of the present invention includes a framework 12 including a pair of primary frame components 14 and a cross member 16.

Each frame component may be constructed of a round metal rod provided with a bend, as at 18, defining first and second sections 20 and 22, respectively, angularly disposed with respect to each other at an obtuse included angle.

First sections 20 diverge outwardly away from each other from sharpened distal ends 24 to their opposite ends at the bends 18, and second sections 22 diverge outwardly away from each other from their ends located at bends 18 to their outer distal ends 26.

The cross member 16 is fixed by welding or the like to each of the first sections 20, and has a central portion 28 and a pair of outer wing portions 30 and 31, each defining an obtuse included angle with the central portion 28. Parts of the wing portions project outwardly beyond their point of juncture with the first sections 20 and one of these parts 31 is provided with an aperture 32 while the other part 30 has an angularly disposed notch 34 opening toward the bends 18.

A flexible member 36, such as a steel cable or the like, has one end received in the aperture 32 and a plurality of slip rings fixed along its length by crimping to form an anchor 38 at the end received in aperture 32 and a series of spaced stops 40 designed to engage the sides of the notch 34. It will be noted that in FIG. 1 of the drawings the notch is positioned on the right-hand side of the unit to accommodate a right-handed person when the unit is being used, for example, as a climbing seat and on the left-hand side in FIG. 2 to accommodate a left-handed person.

A support member 42 in one mode of the invention spans the second sections 22 and is releasably secured thereto by means of clips 44, bolts 46 and nuts 48. It will be noted that when desired the nuts may be removed from the bolts to allow ready removal of support member 42, but because of the angular relationship of the second sections 22 the support member will not slide off the second sections even if the nut, bolt and clip fastening is loosened.

As will presently be described, when used as a climbing seat the accessory 10 is gripped at the first sections 20 intermediate the cross member 16 and the bends 18, and to accommodate the hands of the user tubular hand grips 50 are received on first sections 20.

Figure 3:
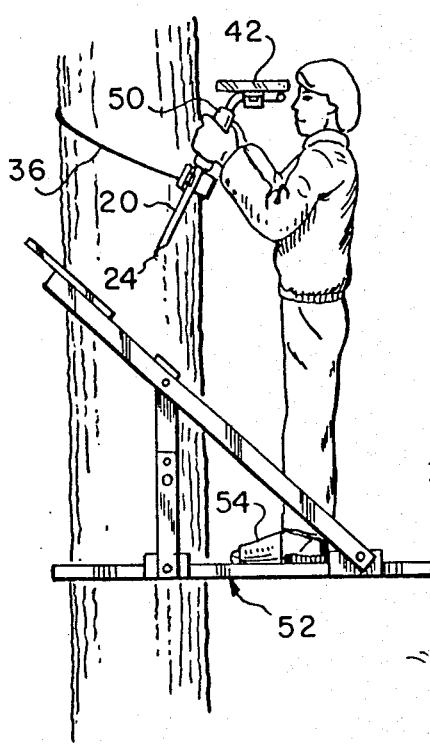
FIG. 3 shows the present invention used as a climbing seat in conjunction with a tree stand.

Thus, as seen in FIG. 3 of the drawings, when used in conjunction with a conventional tree stand 52 having foot straps 54 the user of the climbing seat grasps the hand grips 50, and by bending his legs draws the tree stand 52 upwardly. He thereafter straightens his legs, at the same time moving the climbing seat farther up the tree trunk. If the trunk diminishes in diameter, the effective length of the cable 36 may be shortened by engaging successive ones of the stops 40 with the sides of the slots 34. Similarly, if an outwardly projecting branch is encountered during the climbing operation the cable 36 can be removed from the notch 34, the climbing seat moved up beyond the branch, and the cable reengaged with the slot 34.

Figure 4:
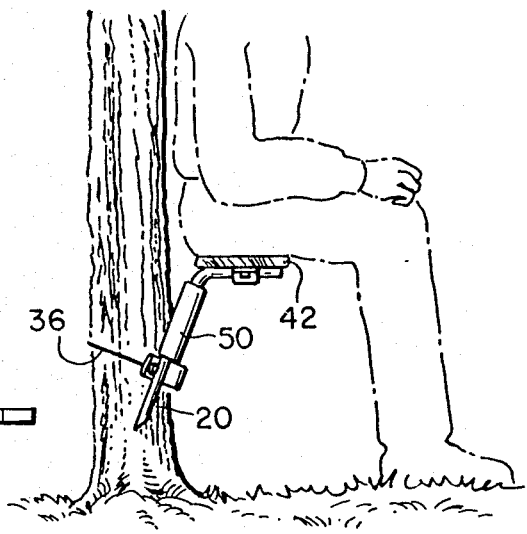
FIG. 4 shows the invention used as a seat.

Of course, if it is desired to simply use the present invention as a seat at ground level it can be attached to a tree or other vertically extending member as shown in FIG. 4 of the drawings.

When it is desired to use the present invention as a backpacking device, it is inverted from the position shown in FIGS. 3 and 4 of the drawings to that shown in FIGS. 5 and 6. Additionally, pipes 56 may be slipped over the outer ends of the first sections 20 to both cover the sharpened ends 24 and provide an extension to which a strap 58 may be attached and passed around the chest of the wearer for greater stability. The cable 36 is, of course, passed around the waist of the wearer and adjusted to his or her girth by means of the spaced stops 40, and an elastic cord 60 or the like may be used as shown in FIG. 6 to secure the load carried to the backpack.

With reference to FIGS. 7 and 8 of the drawings, it will be seen that the present invention can be quickly modified to serve as a camping accessory for supporting a camp stove, cooler or other camping equipment. To accomplish this the nuts and bolts 46 and 48 and clips 44 are removed and pipe extensions 62 of suitable length are slipped over the second sections 22 of the main components 14. Thereafter one or more boards 64, branches or other shelf-defining members may be placed across the extensions 62 to provide a camp shelf as shown in FIG. 8.

Figure 9:
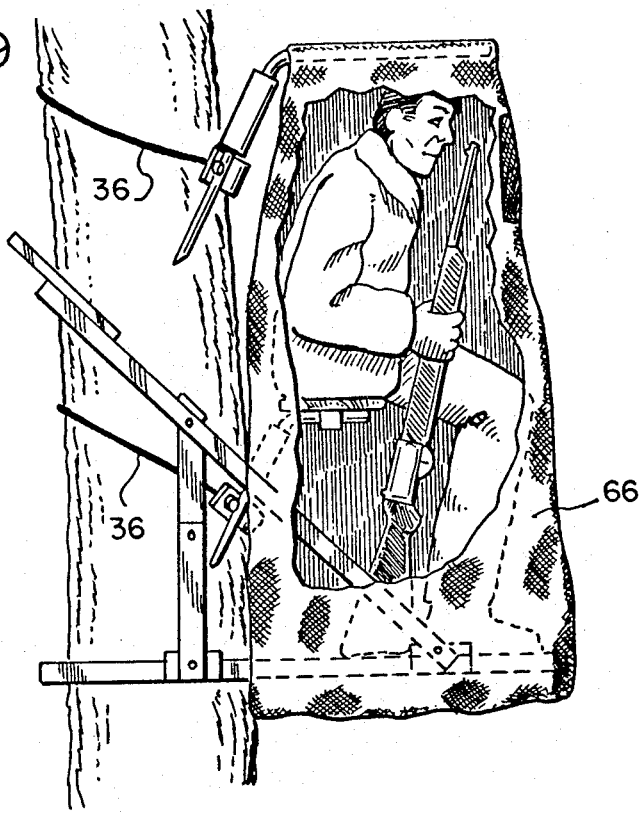
FIG. 9 illustrates a hunter's blind wherein the invention serves as a supporting frame for camouflage material.

When so modified the present invention can also function as a framework for a hunter's blind as shown in FIG. 9 of the drawings. In this case, instead of placing boards or the like across the extensions 62, camouflage netting 66 can be draped over the frame provided by the present invention, providing a hunter with a convenient blind. If desired a tree stand and climbing seat as shown in FIG. 3 of the drawings can be used in conjunction with the blind, as also shown in FIG. 9.

In some instances it may be desirable to store or carry the present invention, and in this case it may be desirable to provide sheaths 68 of any suitable, tubular material, as shown in FIG. 10 of the drawings, to prevent inadvertent injury or damage by the sharpened ends 24 of the primary frame components.

From the above it will be seen that the present invention provides a combination hunting, backpacking and camping accessory of lightweight, simple, but highly efficient construction, which can be easily converted from one mode of use to another with a minimum of additional components and tools.

While the articles herein described constitute preferred embodiments of the invention, it is to be understood that the invention is not limited to these precise articles, and that changes may be made therein without departing from the scope of the invention which is defined in the appended claims.

What is claimed is:
1. A combination hunting, backpacking and camping accessory comprising:
  a framework for said accessory including a pair of primary frame components fixed with respect to each other,
  said frame components comprising:
    first sections having distal ends and ends opposite said distal ends, and
    second sections having distal ends and ends opposite said distal ends joined to said opposite ends of said first sections,
  said first and second sections being angularly disposed with respect to each other,
  said first sections diverging outwardly away from each other from their disstal ends to their opposite ends,
  said second sections diverging outwardly away from each other from their opposite ends to their distal ends, and flexible securing means attached to said framework and having an adjustable effective length for securing said framework to members of varying girths.

2. The combination of claim 1 wherein said framework further includes a cross member attached to and interconnecting said components.

3. The combination of claim 1 further comprising:
support means for supporting a user when said accessory is used as a tree stand and for supporting an object when otherwise used spanning said second sections, and
means releasably securing said support member to said second sections.

4. The combination of claim 1 wherein said first and second sections are formed from a continuous member having a bend intermediate its ends.

5. The combination of claim 1 wherein:
said framework further includes a cross member attached to and interconnecting said frame components,
parts of said cross member extend outwardly beyond said frame components, and
said flexible securing means attached to said outwardly extending parts of said cross member.

6. The combination of claim 1 wherein:
said framework further includes a cross member attached to said first sections intermediate said distal and opposite ends thereof, and
hand grips mounted on said first sections intermediate said opposite ends thereof and said cross member.

7. The combination of claim 1 wherein:
said framework further includes a cross member attached to and interconnecting said frame components,
said cross member has outer wing portions extending outwardly beyond said frame components, and
said flexible securing means is fixed at one end to one of said wing portions and releasbly engages the other of said wing portions.

8. The combination of claim 1 wherein said distal ends of said first sections are sharpened.

9. The combination of claim 1 wherein said flexible securing means has a plurality of stops fixed to it along its length.

10. A combination hunting, backpacking and camping accessory comprising:
a framework of or said accessory consisting of a pair of round metal rods and a flat metal strap,
each of said rods having a bend at an obtuse included angle intermediate its length defining first and second sections,
said first section being substantially longer than said second section and having a sharpened distal end and an opposite end joined to said second section at said bend,
said first sections diverging outwardly away from each other from said distal ends thereof to said bends,
said second sections having outer ends and diverging outwardly away from each other from said bends to said outer ends thereof,
said strap having a central portion and a pair of outer wing portions each defining an obtuse included angle with said central portion,
said wing portions being welded to said first sections intermediate their lengths with parts of said wing portions extending outwardly beyond said first sections,
a cable fixed at one end to one of said parts of said wing portions,
a plurality of slip rings crimped on said cable and fixed with respect thereto,
means defining a notch in the other of said parts of said wing portions opening toward one of said bends,
said notch having a width greater than the diameter of said cable but less than the diameter of said slip rings,
a support member spanning said second sections,
means for releasably securing said support member to said second sections, and
tubular hand grips received on said first sections intermediate said bends and said strap.

* * * * *